United States Patent
Stetina et al.

(10) Patent No.: US 9,255,575 B2
(45) Date of Patent: Feb. 9, 2016

(54) COMPONENT HAVING REDUCED METAL ADHESION

(75) Inventors: Gerold Stetina, Voecklabruck (AT); Matthias Grafinger, Gmunden (AT); Martin Reisner, St. Lorenzen/Muerztal (AT)

(73) Assignee: Miba Sinter Austria GmbH, Laakirchen (AT)

( * ) Notice: Subject to any disclaimer, the term of this patent is extended or adjusted under 35 U.S.C. 154(b) by 294 days.

(21) Appl. No.: 13/702,608

(22) PCT Filed: Jun. 9, 2011

(86) PCT No.: PCT/AT2011/000259
§ 371 (c)(1),
(2), (4) Date: Dec. 7, 2012

(87) PCT Pub. No.: WO2011/153573
PCT Pub. Date: Dec. 15, 2011

(65) Prior Publication Data
US 2013/0089454 A1  Apr. 11, 2013

(30) Foreign Application Priority Data
Jun. 10, 2010  (AT) .................................... 946/2010

(51) Int. Cl.
*F01C 21/00* (2006.01)
*F04C 15/00* (2006.01)
(Continued)

(52) U.S. Cl.
CPC ............... *F04C 15/00* (2013.01); *B22F 3/1035* (2013.01); *C22C 33/0228* (2013.01);
(Continued)

(58) Field of Classification Search
CPC ...................................................... B22F 3/1035
USPC ............................... 418/178, 179; 419/11, 25
See application file for complete search history.

(56) References Cited

U.S. PATENT DOCUMENTS 3,689,255 A * 9/1972 Bolterra .................... C21C 1/10
420/18
4,042,385 A   8/1977 Miyake et al.
(Continued)

FOREIGN PATENT DOCUMENTS

CN   1344814 A    4/2002
DE   25 50 428     5/1976
(Continued)

OTHER PUBLICATIONS

Material and Processs in Manufacturing, DeGarmo, Paul, Darvic Associates, In, 1979, Fiith Edition, p. 329.*
(Continued)

*Primary Examiner* — Jorge Pereiro
*Assistant Examiner* — Deming Wan
(74) *Attorney, Agent, or Firm* — Collard & Roe, P.C.

(57) ABSTRACT

The invention relates to an assembly (1) having at least two metallic components (2, 3) which are subject to sliding stress and each have a sliding surface and in operation slide against one another, wherein at least one of the components (2, 3) consists of a metallic sintered material having an iron-based matrix containing iron together with carbon and up to 10% by weight of at least one non-ferrous metal at least in the region of the sliding stress, where the carbon content is at least 1% by weight and not more than 10% by weight and at least part of the carbon is present in unbound particulate form in the matrix.

12 Claims, 1 Drawing Sheet

Figure 1:
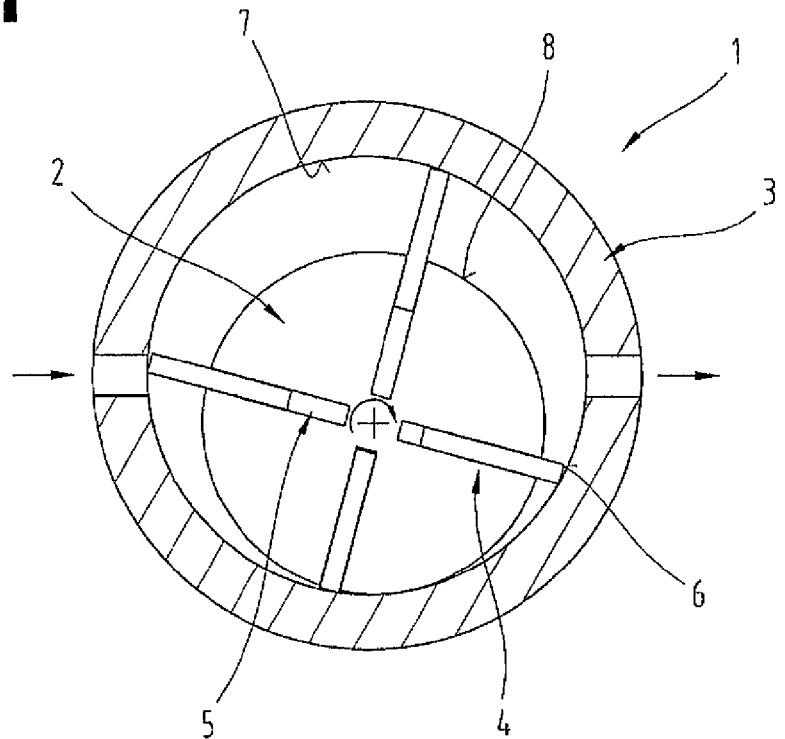

(51) Int. Cl.

| | |
|---|---|
| *F04C 29/00* | (2006.01) |
| *C22C 33/02* | (2006.01) |
| *B32B 15/00* | (2006.01) |
| *B22D 25/00* | (2006.01) |
| *B22D 27/00* | (2006.01) |
| *B32B 15/14* | (2006.01) |
| *B22F 3/10* | (2006.01) |
| *F16C 9/00* | (2006.01) |
| *F04C 2/00* | (2006.01) |
| *F16C 33/06* | (2006.01) |
| *C22C 38/00* | (2006.01) |
| *C22C 38/02* | (2006.01) |
| *F16C 33/12* | (2006.01) |
| *B22F 5/00* | (2006.01) |
| *B22F 5/08* | (2006.01) |
| *B22F 5/10* | (2006.01) |

(52) U.S. Cl.
CPC ........ *C22C 33/0271* (2013.01); *C22C 33/0278* (2013.01); *C22C 38/00* (2013.01); *C22C 38/02* (2013.01); *F04C 2/00* (2013.01); *F16C 9/00* (2013.01); *F16C 33/06* (2013.01); *F16C 33/121* (2013.01); *B22F 5/008* (2013.01); *B22F 5/08* (2013.01); *B22F 5/10* (2013.01); *B22F 2207/01* (2013.01); *B22F 2999/00* (2013.01); *Y10T 29/49245* (2015.01); *Y10T 29/49668* (2015.01)

(56) References Cited

U.S. PATENT DOCUMENTS

| | | |
|---|---|---|
| 5,507,257 A | 4/1996 | Sakai et al. |
| 5,780,170 A | 7/1998 | Gonia et al. |
| 5,937,268 A | 8/1999 | Ozaki et al. |
| 6,302,665 B1 * | 10/2001 | Esumi et al. .................. 418/178 |
| 2004/0112173 A1 * | 6/2004 | Maulik ............... C22C 33/0278 75/246 |
| 2005/0189045 A1 * | 9/2005 | Takayama et al. ............ 148/612 |
| 2006/0032328 A1 | 2/2006 | Chikahata et al. |
| 2008/0146467 A1 * | 6/2008 | Takayama ..................... 508/105 |
| 2009/0148284 A1 * | 6/2009 | Dreifert et al. ................ 415/230 |

FOREIGN PATENT DOCUMENTS

| | | |
|---|---|---|
| EP | 0 621 347 | 10/1994 |
| EP | 1 619 263 | 1/2006 |
| JP | 5043994 | 2/1993 |
| JP | 2001/123253 | 5/2001 |
| JP | 2005-226141 | 8/2005 |
| WO | 95/18877 A2 | 7/1995 |

OTHER PUBLICATIONS

International Search Report of PCT/AT2011/000259, Jan. 15, 2013, total of four (4) pages.
International Search Report of PCT/AT2011/000259, Jan. 15, 2013.

* cited by examiner

COMPONENT HAVING REDUCED METAL ADHESION

CROSS REFERENCE TO RELATED APPLICATIONS

This application is the National Stage of PCT/AT2011/000259 filed on Jun. 9, 2011, which claims priority under 35 U.S.C. §119 of Austrian Application No. A 946/2010 filed on Jun. 10, 2010, the disclosure of which is incorporated by reference. The international application under PCT article 21(2) was not published in English.

The invention relates to an assembly, in particular a pump for a motor vehicle, comprising at least two metal components subject to sliding stress, in particular a stator and a rotor, each having a sliding surface and in operation sliding against one another, wherein at least one of the components at least in the area of sliding stress is made from a metal sintered material having an iron-based matrix, which in addition to iron contains carbon and up to 10 wt. % of at least one non-ferrous metal, wherein the proportion of carbon is at least 1 wt. %, a method for producing a component with reduced metal adhesion by means of the liquid-phase sintering of a powder mixture made of a metal sintered material with an iron base, which in addition to iron contains carbon and up to 10 wt. % of at least one non-ferrous metal, wherein the proportion of carbon is at least 1 wt. %, and the use of an iron-based sintered alloy.

To improve the sliding properties of metal surfaces it is known to coat the surfaces subject to sliding stress with phosphate layers, for example manganese-phosphate layers. Although, the layers have proved effective they are associated with a higher costs during the production of such components. Furthermore, also a suitably uniform layer thickness and a high degree of adhesiveness of said layers has to be ensured, which increases the production costs further.

The present invention addresses the problem of finding a way in which the metal adhesion between metal components, in particular a pump for use in motor vehicles, can be reduced.

This problem is solved independently by the aforementioned assembly, in which the sintered alloy has a carbon content of a maximum of 10 wt. % and at least a portion of the carbon is present in unbound particulate form in the matrix, by the method for producing a component, according to which the carbon is added to the iron base in an amount of a maximum of 10 wt. % and at least a portion of the carbon is provided in unbound particulate form in the matrix or is deposited after the sintering, and by the use of an iron-based sintered alloy which in addition to iron contains carbon and up to 10 wt. % of at least one non-ferrous metal, wherein the amount of carbon is at least 1.5 wt. % and a maximum of 10 wt. % and wherein at least a portion of the carbon is present in unbound particulate form in the matrix for the production of at least one part of a stator and/or a rotor of a pump of a motor vehicle subject to sliding stress or for the production of at least one part of a crankshaft or a bearing bush of a combustion engine subject to sliding stress.

It is an advantage in this case that by means of the unbound carbon the component, i.e. the sliding surface of the component, has a lower coefficient of friction in the pairing with the additional metal component of the assembly. In this way there is no need for a phosphate layer, so that the two sliding surfaces of the two metal components can slide directly on one another. The carbon which is in free form in the iron matrix means that the sliding surface has a self-lubricating effect, so that the assembly has improved tribological properties and thereby can also be used in highly-stressed combustion engines, without further processing being necessary after the powdered metallurgical production. On the basis of free carbon in the structure of the component the latter also has excellent emergency running properties. Surprisingly it has also been shown that the mechanical parameters of the sintered material are at least also comparable to those of GJS 50 or WV 50 even without subsequent processing and despite the high proportion of carbon, whereby its use is particularly advantageous in the aforementioned pumps or for sliding surfaces of crankshafts and bearing bushes. It is also surprising that although GJS 50 partly has comparable amounts of graphite, this material exhibits much poorer emergency running or tribological properties than the sintered material of the component of the assembly. Presumably, this is due to the much finer distribution of carbon—whereby in the structure there can also be isolated and low-carbon ferrite rings—despite the liquid phase sintering in the sintered material used. By means of the liquid phase sintering a reduction in the porosity of the sintered material is achieved, whereby the latter has much better mechanical properties than sintered materials, which are not sintered with a liquid phase contribution.

A significant increase in the emergency properties without worsening the strength values of the sintered material could be observed, when the proportion of unbonded carbon relative to the total carbon content of the sintered material was at least 80%, in particular at least 90%.

According to a preferred embodiment variant the amount of carbon is between 1.5 wt. % and 8 wt. %, in particular between 1.8 wt. % and 2.1 wt. %. By keeping to these ranges, in particular the latter range, a more homogenous distribution of carbon in the matrix can be achieved, whereby both the tribological parameters and the strength parameters of the sintered alloy can be improved. In particular, with a proportion of carbon of between 1 wt. %, or 1.5 wt. %, and 2.1 wt. % the precision of the component can be improved, as the proportion of the liquid phase is relatively low, whereby warping of the component can be avoided more effectively, Low amounts of carbon from this range also determine a higher sintering temperature for liquid phase sintering, whereby a greater compaction of the component can be achieved during the sintering process.

Although in GIS 50 the graphite is preferably in the form of a "spheroidal graphite", in order to improve the mechanical properties in this way, it has been shown during the invention that with regard to the desired properties of the sintered material, in particular with regard to the improved tribological properties it is an advantage if the unbonded carbon has a particle size with a length of between 50 μm and 300 μm, in particular between 100 μm and 200 μm, and a width of between 5 μm and 70 μm, in particular between 8 μm and 18 μm, whereby it is an additional advantage if the ratio of the length to the width of the carbon particles is at least 2:1, in particular at least 5:1, preferably at least 10:1.

The carbon in the core layer or layers can be more globular and coarser than in the edge layer or layers of the component, wherein the edge layer is a layer thickness of up to 2 mm, whereby it can be achieved that the core layers exhibit a reduced notching effect, but the edge layers because of the vermicular and finely distributed graphite have better sliding properties. The edge layer is not necessarily the layer that is present after sintering, but the layer which is formed on the finished component, for example after the mechanical final processing of the component by a removing process for increasing the precision of the component. In particular, this removing or chipping processing also has the advantage that in this way graphite grains come to lie directly on the surface or are exposed, whereby the tribology of the component can be improved. The difference of the average grain diameter can in this way be at least 10%. The average grain diameter is defined as the arithmetic mean of the diameter of 20 grains, measured in microsection. This can be influenced by the cooling differences of the core layers compared to the edge layers, for example by rapid cooling at a cooling rate of at least 0.5 K/s.

Furthermore, the graphite can be deliberately made globular by corresponding processing and subsequent heat treatments, for example by tempering at a temperature in a range of between 200 °C. and 500 °C., in particular in a range of between 300 °C. and 400 °C., for a period of 10 minutes to 60 minutes, in particular 20 minutes to 40 minutes. In this way also the distribution in the component of pearlite :ferrite can be influenced.

With regard to the mechanical properties, i.e. the strength properties, of the sintered material it is an advantage if its matrix has a structure composed of pearlite and ferrite. In particular, according to one embodiment variant the ratio of pearlite to ferrite is between 95 : 5 and 50 : 50, preferably between 90 : 10 and 80 : 20. In particular, by keeping to a ratio from this range it is possible to obtain a balanced mix of properties with regard to the strength and slidability of the surface of the component.

It is possible in this way that the amount of pearlite in the matrix increases in the direction of the sliding surface so that the surface also has improved strength in addition to improved tribology.

To improve the tribology of the surface of the component it is also an advantage if the proportion of free carbon increases in the direction of the sliding surface. In this way it is also achieved that the component has greater strength on the inside, i.e. in the area of a core layer.

Preferably, at least one of the non-ferrous metals is formed by silicon, whereby according to one embodiment variant the amount of silicon is between 0.5 wt. % and 6.0 wt. %. It can be achieved in this way that even with low absolute amounts of carbon in the matrix the relative amount of free carbon is much greater than the bonded carbon, as by means of silicon the solubility causes a displacement of the eutectic in the Fe—C-system, whereby the improved tribological properties can be achieved with greater reliability, even with slight fluctuations of the processing parameters. It can thereby also be achieved that the hardness of the powder to be compressed can also be kept relatively low even at high carbon contents, so that the compressibility of the powder is better despite the high amount of carbon.

In particular, silicon contents of between 0.8 wt. % and 1.6 wt. % have proved particularly advantageous.

With regard to the tribological properties of the component it is an advantage for the above reasons if the proportion of silicon to the proportion of carbon is selected from a range of from 1:1 to 4:1, in particular from a range of 2:1 to 3:1.

A flat surface with defined roughness has a particularly advantageous effect on the tribological properties. Typically tribologically highly stressed surfaces are polished mechanically, whereby the free unbonded graphites on the surface are particularly favorable for the emergency running properties. In this connection it has been found that a surface roughness of the sliding surface, i.e. an average roughness Rz according to DIN EN ISO 4287, should not exceed a maximum value of 2 µm, in particular 1.5 µm.

The component made of the sintered material preferably has a density of at least 95% of the theoretic full density. In other words the component has a relatively low porosity, whereby its application in particular in pumps can be improved on the basis of a reduced risk of corrosion and an improved fluid tightness.

Particularly preferably, however the component has a density of at least 98% of the theoretic full density at least in the area of the sliding surface or in the areas close to the sliding surface (corresponds to a depth of up to 100 µm measured from the sliding surface), preferably in the whole component.

As already mentioned above, it is preferable if the sliding surface is free of phosphate coating.

According to one embodiment variant of the method the sintering and/or the cooling of the component following the sintering is performed in a carbon-containing atmosphere. In this way carburization, i.e. increase in the amount of carbon, can be achieved, at least in the area close to the surface, whereby this proportion of carbon is also present in the matrix at least partly in an unbound form. Moreover, in this way any losses of carbon occurring during the sintering can be compensated for at least partly.

With regard to the preferred, aforementioned structure of the matrix it is an advantage if the component is cooled after sintering at a cooling rate of a maximum of 15 K/s, in particular a maximum of 8 K/s, for example at a cooling rate of between 0.8 K/s and 1 K/s.

For a better understanding of the invention the latter is explained in more detail with reference to the following example.

In a simplified schematic view 1. shows the embodiment of an assembly as a pump for a motor vehicle in face view in cross section;
2. shows an embodiment variant of the assembly.

First of all, it should be noted that the details relating to position used in the description, such as e.g. top, bottom, side etc., relate to the currently described and represented figure and in case of a change in position should be adjusted to the new position.

All of the details relating to value ranges in the present description are defined such that the latter include any and all part ranges thereof. In particular the range 1 wt. % to 10 wt. % for the carbon content and the aforementioned preferred part ranges are defined such that it is also possible within the scope of the invention that the range for the carbon content in the alloy has a lower limit of 1 wt. % and an upper limit of 8 wt. % or 4 wt. %. Likewise the range for the carbon content can have a lower limit of 4 wt. % or 8 wt. % and an upper limit of 10 wt. %. In a similar manner this also applies to the ranges defined later in this description.

FIG. 1 shows a simplified view of an assembly 1 in the form of a pump. As the structural details of such a pump are not the subject matter of the invention, a detailed description of this kind of pump is not given here, as the latter would be already known to a person skilled in the art.

The assembly 1 comprises a first component 2 in the form of a rotor and a second component 3 in the form of a stator or housing, whereby the first component 2 is surrounded at least in the area of the circumference by the second component 3. On the first component 2 wing elements 4 are arranged radially displaceably in corresponding recesses 5 such that on the basis of the centrifugal force created by the rotational movement of the first component 2 they bear with an face side 6 against an inner surface 7 of the second component 3. If necessary said wing elements 4 can also bear against the inner surface 7 supported by springs, for which reason spring elements can be arranged in the recesses 5.

It should be mentioned that the shown number of wing elements 4 is not considered to be restrictive to the invention.

Figure 2:
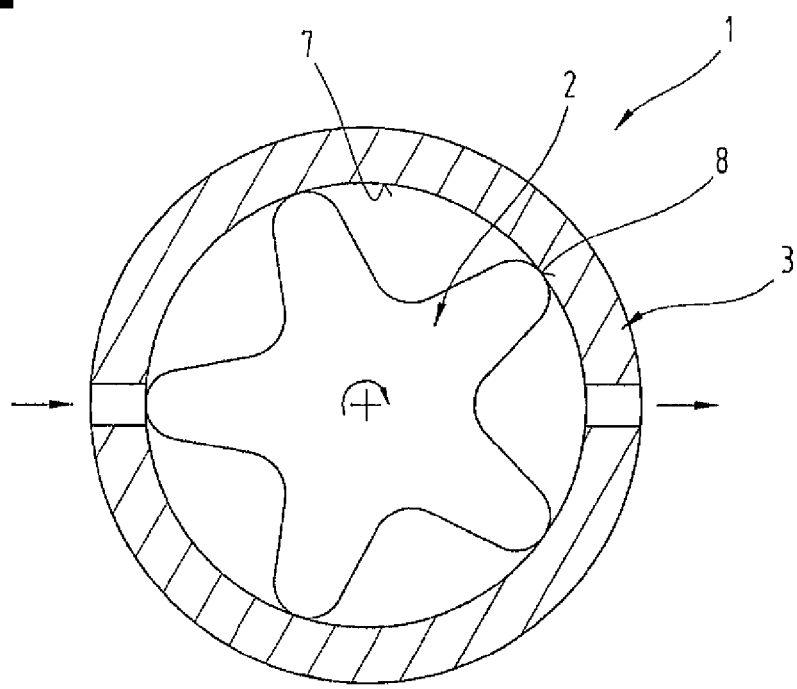

Of course, it is also possible to have a different structural design for the assembly 1 configured as a pump. In order to clarify this FIG. 2 shows an embodiment variant of the assembly 1 in the form of a pump without wing elements 4 and a different configuration of the first component 2 in the form of the rotor, which is arranged inside the second component 3 and slides on the inner surface 7 of the component 3 with part of a surface 8, as is also the case in the embodiment according to FIG. 1.

The surfaces 7 and 8 of the components 2, 3 are sliding surfaces against which the other respective component 2, 3 slides.

It is essential for the invention that at least one of the components 2, 3 of the assembly, at least in the area of the surface 7 or 8, but preferably completely, is made from a metal sintered material with an iron-based matrix, which in addition to iron contains carbon and up to 10 wt. % of at least of a non-ferrous metal, wherein the proportion of carbon is at least 1 wt. % and a maximum of 10 wt. % and at least a portion of the carbon is present in the matrix as unbound particulate. However, it is also possible for both components 2, 3 at least in the area of the surfaces 7, 8 sliding on one another to be made of sintered material. Metals are used from a group comprising or consisting of Si, Ni, Mo, Mn, Mg, V, W or Al as the non-ferrous metals.

With regard to the formation of the structure of the matrix, in particular the composition of the structure by pearlite and ferrite, where bainit may also be found, it is an advantage if at least one of the non-ferrous metals is formed by silicon. In particular, the proportion of silicon is between 0.5 wt.% and 6.0 wt.%, preferably between 0.8 wt.% and 1.6 wt.%. If additional non-ferrous metals are to be used their proportion is limited preferably to a maximum of 1 wt.%.

The proportion of Ni can be between 0 wt. % and 6.0 wt. %, in particular between 0 wt. % and 1.2 wt. %. In this way the resistance to corrosion, the strength and the hardness of the components 2, 3 can be improved, which is an advantage particularly with respect to the configuration of the components 2, 3 as pump components.

The proportion of Mo can be between 0 wt. % and 1.5 wt. %, in particular between 0 wt. % and 0.9 wt. %, whereby the creep strength can be improved.

The proportion of Mn can be between 0 wt. % and 2.0 wt. %, in particular between 0.1 wt. % and 0.3 wt. %. In this way the strength and the hardness of the component 2, 3 can be improved.

The proportion of Mg can be between 0 wt. % and 6.0 wt. %, in particular between 0.2 wt. % and 0.8 wt. %, whereby the habitus of the free carbon can be influenced.

The proportion of V can be between 0 wt. % and 2.0 wt. %, in particular between 0.05 wt. % and 0.15 wt. %. In this way the strength and the hardness of the component 2, 3 can be improved.

The proportion of W can be between 0 wt. % and 1.5 wt. %, in particular between 0 wt. % and 0.1 wt. %. In this way the wearing resistance of the component 2, 3 can be improved.

The proportion of Al can be between 0 wt. % and 6.0 wt. %, in particular between 0.05 wt. % and 0.3 wt. %. In this way the wearing resistance of the component 2, 3 can be improved.

The component 2 or 3 or the components 2, 3 are produced by means of a powder-metallurgical method, which is described in brief in the following.

Essentially the production comprises the steps of powder mixing, pressing, de-waxing and sintering. If necessary thermal post-processing and for a mechanical post-processing can follow.

1) Powder Mixing

Iron-powder mixtures are produced with a total of up to 10 wt. %, preferably a maximum of 7 wt. %, metal non-ferrous alloy elements, up to 10 wt. % carbon in the form of graphite, up to 1.5 wt. % pressing aids and up to 0.5 wt. % organic binder. Said mixtures are produced for example conventionally from pure iron powder or pre-alloyed or alloyed iron powders as base material and the addition of alloy elements and pressing aids. Or so-called parent mixtures in highly-concentrated form, possibly also with the application of temperature and/or solvents, are premixed and then mixed afterwards with iron powder or mixed directly into the iron powder with the addition of the individual components.

Resins, silanes, oils, polymers or adhesives can be used as binding agents. Pressing aids can include waxes, stearates, silanes, amides and polymers.

Pre-alloy elements can be Mo, V, Si, Mn.

2) Pressing

The iron powder mixtures pretreated according to the above method are compacted by means of coaxial pressing methods and brought into shape. In this case it should be ensured that the changes in form and shape caused during the subsequent processing stages have already been taken into consideration in the production of the pressing tools. The use of corresponding lubricants and binding agents have a supporting effect with regard to the compaction. Depending on the bulk density and theoretic density of the powder mixtures pressures of 400 to 1200 MPa are used for this.

The pellets obtained in this way (also known as green compacts) are the starting point for the subsequent processing stages.

Instead of the coaxial pressing method other pressing methods can also be used, which are usual in sintering technology, e.g. including isostatic pressing methods, etc.

To achieve reproducible measuring behaviors during sintering it should be ensured during the pressing that there is a density distribution within the component 2, 3 that is as even as possible or that is at least easy to reproduce. As during the sintering owing to the increased proportion of carbon at the temperatures used a liquid phase is formed, during the pressing the density should be selected at which the density distribution can be as uniform as possible. Owing to the high amount of carbon the theoretically achievable full density is very low (ca. 7.5 g/cm$^3$). Typically pressing densities are therefore 6.4 g/cm$^3$-6.6 g/cm$^3$ but can also be higher depending on the chemical composition and compressibility of the powder.

The possibly needed lubricants can applied either using conventional immersion methods or preferably by spraying methods before or during pressing onto the component.

3) De-waxing+Sintering

The pellets are de-waxed by thermal processing preferably under the action of at least partly carbonizing or slightly oxidizing atmospheric gases, i.e. at least partly freed of organic binding agents and lubricants by burning and sintered, preferably in continually operating sintering furnaces. In this case reducing atmospheres are achieved by the use of nitrogen-hydrogen mixtures with up to 30 vol.-% hydrogen. Optionally also carburization gases such as e.g. methane, propane, or the like, can be used or the de-waxing can be supported by the slightly oxidizing character of the processing gas (possibly only in parts of the sintering furnace), for example by means of endogas, humidified nitrogen or the like. The sintering can however also be performed in a vacuum, whereby a stabilization of the liquid phase can be achieved during the sintering.

The temperatures during the sintering are between 1,050° C. and 1,350° C. depending on the alloy system used, the sintering hold time is between about 2 minutes and 1.5 hours.

Generally during the sintering a sintering temperature should be maintained which is slightly above or along the equilibrium line between the "gamma" and the "gamma+ melt" area in the known iron carbon diagram, as at higher temperatures in a specific composition too much melt is formed, whereby there is an extreme, uncontrollable warping of the component (elephant foot, hourglass, . . . ). It is an advantage if the sintering temperature at the selected amount of carbon of the sintering powder is in the range between the equilibrium line between "gamma" and "gamma+melt" and a maximum of 20%, preferably a maximum of 10% above the said equilibrium temperature, which corresponds to said amount of carbon.

The process guiding during the sintering is selected so that despite the onset of a liquid phase there is as little warping of the component as possible. The reproducibility of the result is supported by a corresponding process control, such as an atmosphere control, temperature control, dew point measurement etc.

Rapid heating to temperatures, in particular at heating rates of 10 K/s, which lead to the formation of a liquid phase, and short sintering times, in particular between 1 minutes and 12 minutes, enable good dimensional control. The liquid phase starts spontaneously according to the composition of the alloy when a specific temperature is reached. Staying too long at the sintering temperature leads to the distortion of the component and therefore should be avoided if possible. The hold time is preferably selected from a range with a lower limit of 8 minutes and an upper limit of 10 minutes. Longer holding times—which require at least almost the full heating of the component 2, 3—do not achieve much further compression. With longer holding times the risk of the component warping increases.

The components 2, 3 are preferably cooled at a cooling rate which is selected from a range with a lower limit of 0.5 K/s, in particular 1 K/s, and 20 K/s, preferably 15 K/s.

If necessary, to achieve higher densities the pellets can also be pre-sintered by thermal treatment at a temperature of below 1,100° C. under the effect of the aforementioned reducing atmospheric gases and possibly pressed afterwards, in particular at the same time as de-waxing. In this way the production of a light sintering compound can be achieved between the particles.

Caused by the compaction to almost full density during the sintering at least in areas close the surface, preferably in the whole component, not only can improved mechanical properties be achieved, but also a very high density from air and liquid media, whereby the components produced according to the method of the invention can also be used in particular in pumps, for example fuel pumps.

4) Thermal Post-processing

Various different heat treatments known from the prior art can be used. Thermal processes can be used to change the ratio of ferrite to pearlite structure components. Furthermore, by means of heat treatments it is possible to change the shaping of the free graphite.

5) Mechanical Processing

All known methods of the mechanical post-processing or coating are possible.

According to this processing sequence the following examples of powder mixtures according to Table 1 were processed into components 2 and/or 3. The amounts are given in wt. %. The remainder to 100 wt. % is formed respectively by iron.

TABLE 1

Sample compositions

| No. | C | Si | Ni | Mo | Mn | Mg | V | W | Al | Pressing aids | poss. binder |
|---|---|---|---|---|---|---|---|---|---|---|---|
| 1 | 2.5 | | | | | | | | | 0.3 | 0.2 |
| 2 | 2.0 | 1.1 | | | | | | | | 0.4 | 0.1 |
| 3 | 3 | 1 | | | | | | | | 0.4 | 0.2 |
| 4 | 5.9 | 1.5 | 0.5 | | | 0.2 | | | | 0.8 | 0.1 |
| 5 | 7.2 | 3.1 | | | | 0.9 | | | | 0.5 | 0.3 |
| 6 | 1.8 | 1.5 | | | | | | | | 0.4 | 0.1 |
| 7 | 4.5 | | 2.1 | 0.3 | | | | 0.8 | | 0.6 | 0.5 |
| 8 | 3.1 | | | 0.8 | 0.5 | | 0.15 | | | 0.8 | 0.4 |
| 9 | 5.6 | 2.8 | | | | 0.5 | | 0.5 | | 0.5 | 0.5 |
| 10 | 3.5 | | | | | 2.2 | | | 1.1 | 0.8 | 0.5 |

These compositions were processed powder metallurgically according to the parameters in Table 2. The sintering atmosphere corresponded to the above details.

TABLE 2

Processing parameters

| No. | Pressure [MPa] | Heating rate [° C./s] | Sintering temperature [° C.] | Hold time during the sintering [min] | Cooling rate [° C./s] |
|---|---|---|---|---|---|
| 1 | 450 | 0.5 | 1050 | 15 | 2 |
| 2 | 600 | 10 | 1200 | 10 | 1.8 |
| 3 | 600 | 20 | 1150 | 15 | 5 |
| 4 | 1100 | 10 | 1300 | 2 | 2 |
| 5 | 1200 | 20 | 1350 | 5 | 6 |
| 6 | 1000 | 10 | 1150 | 10 | 0.5 |
| 7 | 700 | 9 | 1180 | 7 | 2 |
| 8 | 700 | 16 | 1250 | 7 | 6 |
| 9 | 700 | 16 | 1350 | 2 | 2 |
| 10 | 900 | 10 | 1220 | 6 | 2 |

Of the finished components 2 and/or 3 on the one hand the relative proportion of the unbound carbon present in the matrix, the density, the friction coefficient and the hardness were determined. The results are summarized in Table 3. The free graphite was determined by way of microsections, where the values given in Table 3 are average values from five difference sections. The density was determined according to the buoyancy principle. The hardness was defined as Vickers hardness HV 5.

TABLE 3

Measurement results

| No | Unbound carbon [%] | Density [g/cm$^3$] | Friction coefficient | HV 5 |
|---|---|---|---|---|
| 1 | 80 | 7.32 | 0.3 | 280 |
| 2 | 96 | 7.51 | 0.1 | 345 |
| 3 | 95 | 7.42 | 0.3 | 300 |
| 4 | 92 | 7.44 | 0.2 | 305 |
| 5 | 95 | 7.50 | 0.15 | 315 |
| 6 | 98 | 7.48 | 0.1 | 350 |
| 7 | 88 | 7.38 | 0.25 | 260 |
| 8 | 95 | 7.51 | 0.1 | 310 |
| 9 | 98 | 7.50 | 0.2 | 300 |
| 10 | 92 | 7.47 | 0.3 | 300 |

On the basis of the established parameters the proportion of unbound carbon is preferably at least 80% relative to the total carbon content. The total proportion of carbon is in this case preferably between 1.8 wt % and 2.1 wt. %.

With reference to the microsections it could also be established that it is an advantage with respect to the properties of the sintered alloy, if the unbound carbon has a particle size with a length of between 50 µm and 300 µm, in particular between 100 µm and 200 µm, and a width of between 5 µm and 70 µm, in particular between 8 µm and 18 µm, whereby it is also an advantage if the ratio of the length to the width of the carbon particles is at least 2:1, in particular at least 5:1, preferably at least 10:1.

It could also be established with reference to the microsections that it is an advantage for the tribological behavior of the component 2 and/or 3 if the matrix has a structure composed of pearlite and ferrite, whereby preferably the ratio of pearlite to ferrite is between 95 : 5 and 50 : 50, in particular between 90 : 10 and 80 : 20. In addition, also further examinations were made on a composition according to Example 1 from Table 1, wherein it was established that higher strengths could be achieved by means of a corresponding heat treatment by varying the pearlite/ferrite ratio and possibly variously formable free carbon. The results are summarized in Table 4. The proportion of pearlite in the matrix was determined from the microsections, where the remainder to 100 vol.-% consists at least almost completely of ferrite.

TABLE 4

Influence of the ferrite/pearlite ratio

| No. | Proportion of pearlite [%] | Heat treatment | Hardness HV10 |
|---|---|---|---|
| 11 | 95 | None | 350 |
| 12 | 90 | 0.2 h; 150° C. | 320 |
| 13 | 70 | 0.5 h; 200° C. | 250 |
| 14 | 50 | 1.8 h; 250° C. | 180 |

It is also possible that the proportion of pearlite of the matrix increases in the direction of the sliding surface. This can be achieved for example in that the component 2 and/or 3 is briefly subjected to a heat treatment, for example as indicated in Table 4, so that the component 2 and/or 3 is not completely heated to the temperature, so that there is an increased formation of pearlite only in the edge areas of the component 2 and/or 3.

It is also possible that the proportion of free carbon increases in the direction of the sliding surface, which can be achieved e.g. by a carburizing, sintering atmosphere or a carburizing atmosphere during the cooling of the component 2 and/or after the sintering.

To improve the tribological properties it is also an advantage if the sliding surface of the component 2 and/or 3 has a surface roughness, as typically known from polished surfaces.

Preferably, the component 2 and/or 3 has a density which is at least 95% of the theoretical full density.

The components 2 and/or 3 according to the invention are preferably used in a pump or for the production of at least one part of a crankshaft or a bearing bush of a combustion engine which is subject to sliding stress.

The exemplary embodiments show possible embodiment variants of the assembly 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the assembly 1 the latter and its components have not been represented true to scale in part and/or have been enlarged and/or reduced in size.

List of Reference Numerals

1 Assembly
2 Component
3 Component
4 Wing element
5 Recess
6 Face side
7 Surface
8 Surface
9
10

The invention claimed is:

1. An assembly comprising a first metal component and a second metal component which are subject to sliding stress, the first metal component comprising a first metal component outer surface and a first metal component inner surface and the second metal component comprising a second metal component outer surface and a second metal component inner core, the first metal component inner surface and the second metal component outer surface each forming a respective sliding surface in operation sliding against one another, where at least one of the first metal component and the second metal component completely is made from a metal sintered material having an iron-based matrix, which in addition to iron contains carbon and up to 10 wt. % of at least one non-ferrous metal, the proportion of carbon content being at least 1 wt. %, wherein the carbon content is a maximum of 10 wt. % and at least a portion of the carbon is present in unbound particulate form in the iron-based matrix and wherein the iron-based matrix has a structure composed of pearlite and ferrite, wherein a proportion of pearlite in the iron-based matrix increases through at least one of a direction from the first metal component outer surface to the first metal component inner surface and a direction from the second metal component inner core to the second metal component outer surface.

2. The assembly as claimed in claim 1, wherein the proportion of unbound carbon particulate is at least 80.0%.

3. The assembly as claimed in claim 1, wherein the proportion of carbon is between 1.5 wt. % and 8 wt. %.

4. The assembly as claimed in claim 1, wherein the unbound carbon particulate has a particle size with a length of between 50 µm and 300 µm and a width of between 5 µm and 70 µm.

5. The assembly as claimed in claim 1, wherein the ratio of pearlite to ferrite is between 95 : 5 and 50 : 50.

6. The assembly as claimed in claim 1, wherein the proportion of unbound carbon particulate in the iron-based matrix increases through at least one of the direction from the first metal component outer surface to the first metal component inner surface and the direction from the second metal component inner core to the second metal component outer surface.

7. The assembly as claimed in claim 1, wherein at least one of the non-ferrous metals is formed by silicon.

8. The assembly as claimed in claim 7, wherein the proportion of silicon is between 0.5 wt. % and 6 wt. %.

9. The assembly as claimed in claim 1, wherein the sliding surface has a surface roughness Rz of a maximum of 2.0 µm.

10. The assembly as claimed in claim 1, wherein the component made of sintered material has a density of at least 95% of the theoretic full density.

11. The assembly as claimed in claim 1, wherein the sliding surface is free of a phosphate coating.

12. An assembly comprising a first metal component and a second metal component which are subject to sliding stress, the first metal component comprising a first metal component outer surface and a first metal component inner surface and the second metal component comprising a second metal component outer surface and a second metal component inner core, the first metal component inner surface and the second metal component outer surface each forming a respective sliding surface in operation sliding against one another, where at least one of the first metal component and the second metal component completely is made from a metal sintered material having an iron-based matrix, which in addition to iron contains carbon and up to 10 wt. % of at least one non-ferrous metal, the proportion of carbon content being at least 1 wt. %, wherein the carbon content is a maximum of 10 wt. % and at least a portion of the carbon is present in unbound carbon particulate form in the iron-based matrix and wherein the iron-based matrix has a structure composed of pearlite and ferrite, wherein a proportion of pearlite in the iron-based matrix increases through at least one of a direction from the first metal component outer surface to the first metal component inner surface and a direction from the second metal component inner core to the second metal component outer surface, and wherein the carbon in a core layer of at least one of the first metal component and the second metal component is more globular and coarser than in an outer surface layer of the at least one of the first metal component and the second metal component, the outer surface layer having a layer thickness of up to 2 mm.

* * * * *